No. 791,797. Patented June 6, 1905.

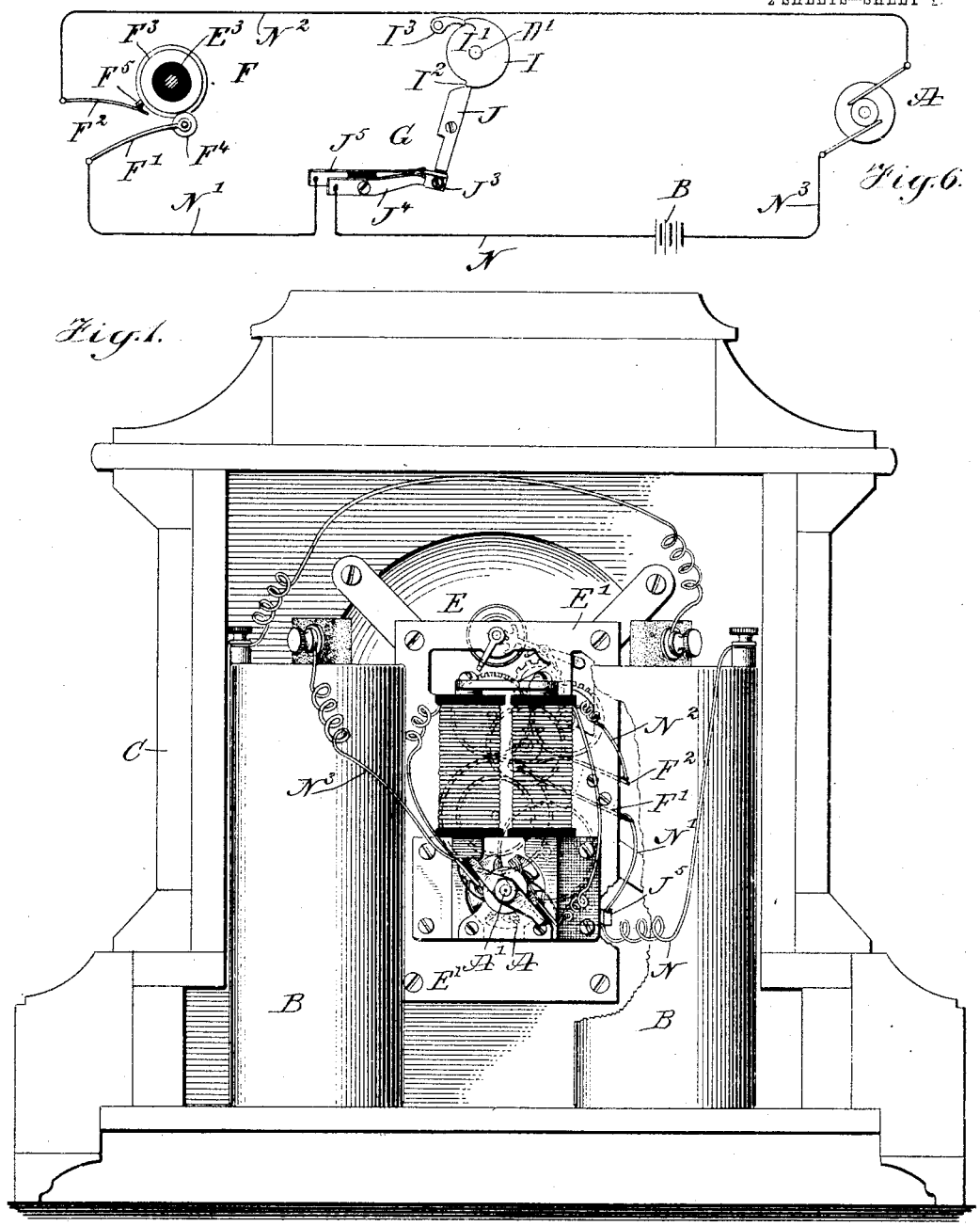

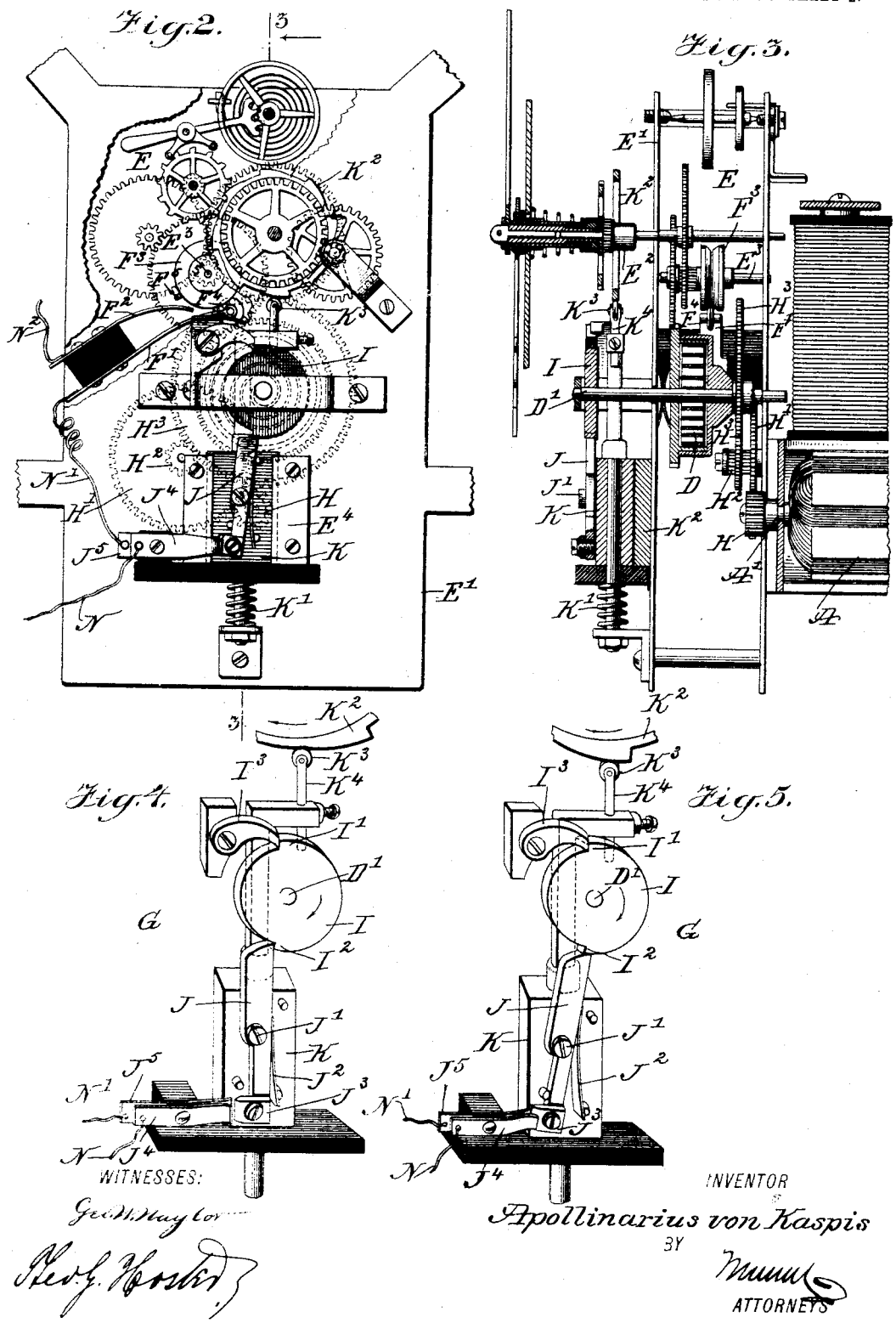

UNITED STATES PATENT OFFICE.

APOLLINARIUS VON KASPIS, OF WEEHAWKEN, NEW JERSEY.

ELECTRIC SELF-WINDING CLOCK.

SPECIFICATION forming part of Letters Patent No. 791,797, dated June 6, 1905.

Application filed June 23, 1904. Serial No. 213,902.

*To all whom it may concern:*

Be it known that I, APOLLINARIUS VON KASPIS, a subject of the Emperor of Austria-Hungary, and a resident of Weehawken, in the county of Hudson and State of New Jersey, have invented a new and Improved Electrically-Self-Winding Clock, of which the following is a full, clear, and exact description.

The invention relates to escapement-clocks driven by spring-motors; and its object is to provide a new and improved electrically-self-winding clock arranged to require but a comparatively small spring for driving the clockwork, to reduce the work required by the spring to a minimum, to insure accurate running of the clock at all times, and to permit of dispensing with a pendulum.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a rear elevation of the improvement, the back cover of the clock-frame being removed and parts being broken out. Fig. 2 is a front elevation of the improvement, parts being broken out and the clock-frame removed. Fig. 3 is a cross-section of the same on the line 3 3 of Fig. 2. Fig. 4 is a perspective view of the initial or controlling switch mechanism. Fig. 5 is a like view of the same, showing the parts in a different position; and Fig. 6 is a diagrammatic view of the electric circuit.

In the electrically-self-winding clock presently to be described in detail use is made of an electric motor A, connected with a battery B or other similar source of electrical energy, both the motor A and the battery B being preferably located in the housing C of the clock. The motor A is set periodically in action (the periods being of very short duration—say of about seven and one-half minutes) to wind up the spring D of the clockwork E, which may be of any approved construction, the arrangement, however, being such that the power of the spring D is used only for driving the clockwork E during a portion of its unwinding, and the spring D is neither allowed to run entirely down nor is it wound up to its full extent or overwound, as is so frequently the case with clocks wound up by a manually-actuated key. The action of the spring is thus practically uniform, and a pendulum is hence not required to insure accurate running of the clock.

Undue loss of electrical energy is prevented by using in the circuit between the motor A and the battery B an automatic motor-switch F and an automatic controlling-switch G, of which the controlling-switch G is closed ahead of the motor-switch F, so that when the latter is closed the motor is started to give one turn to the spring-shaft D' to wind up the driving-spring for the clockwork E the desired amount. The controlling-switch G is opened before the motor-switch F is opened, and the controlling-switch is governed from the spring-shaft D' and is opened as soon as the motor A has given one revolution to the spring-shaft D', so that the circuit is broken and the current shut off to the motor for the latter to come to a standstill, notwithstanding that the motor-switch F is still closed and remains closed for a time longer, owing to the slow rotation of the contact making and breaking wheel $F^3$ of this switch F, controlled by a rotatable part of the driving-gear of the clockwork, as hereinafter more fully explained.

The motor A is preferably secured to the rear end of the frame E' of the clockwork, and the motor-shaft A' is connected by a train of gear-wheels H, H', $H^2$, and $H^3$ with the winding-up shaft D' for the driving-spring D, the gear-wheels being so proportioned that the shaft A' makes about forty revolutions to one revolution of the shaft D'. The motor runs about one and one-half seconds, and about one-half ampere is required by three volts.

The controlling-switch G is arranged as follows: On the front end of the spring-shaft D' is secured a cam-wheel I, having two peripheral shoulders I' and $I^2$, of which the upper shoulder I' is adapted to be engaged by a dog I³ and the lower notch is adapted to engage a lever J, fulcrumed at J' on a slide K, pressed upward by a spring K' and mounted to move up and down in a suitable guideway E⁴, secured to the frame E' at the front thereof. A spring J², secured on the slide K, presses the lever J, and on the latter is arranged a contact J³, adapted to pass between the spring members J⁴ and J⁵ of a contact attached to the slide K, it being understood that the contact J³ is normally out of engagement with the contact members J⁴ and J⁵ and only moves into engagement when the lever J is released from the notch I² on moving the slide K downward against the tension of its spring K'. This downward movement is periodically produced (as shown, every seven and one-half minutes) by the use of a cam-wheel K², secured on the minute-hand shaft E² of the clockwork. A friction-roller K³ is in engagement with the peripheral face of the cam-wheel K², and this friction-roller is journaled on the upper end of a rod K⁴, held vertically adjustable on the slide K, as plainly shown in Figs. 3, 4, and 5.

The contact member J⁴ of the controlling-switch G, just described, is connected by a wire N with one pole of the battery B, and the other contact member J⁵ is connected by a wire N' with the spring contact-plate F' of the motor-switch F, having its other spring contact-plate F² connected by a wire N² with the motor A, which in turn is connected by a wire N³ with the other pole of the battery B. The contact-wheel F³ is secured on the intermediate shaft E³ of the clockwork E, and the peripheral face of this contact-wheel is engaged by a friction-roller F⁴ on the contact-plate F', and on the said peripheral face and located out of the path of the friction-roller F⁴ is arranged a contact-point F⁵, adapted to move in and out of engagement with the free end of the other contact-plate, F². The shaft E³ makes one revolution to every one-eighth revolution of the cam-wheel K² on the minute-hand sleeve E², and the said contact-pin F⁵ does not move into contact with the contact-plate F² until a short time after the contact J³ has moved into engagement with the spring members J⁴ and J⁵—that is, the switch F is not closed until after the switch G has been closed.

Now when the switch G is closed and the switch F is closed on the pin F⁵ engaging the plate F² then the circuit is closed and the motor A is actuated and the rotation of the motor-shaft A' is transmitted by the train of gear-wheels H, H', H² and H³ to the spring-shaft D' to wind up the spring D. When the shaft D' has made one revolution, then the lever J, and with it the slide K, moves upward as the upper end of the lever J passes the shoulder I², and hence the lever J swings back to its former position by the action of its spring J², and the contact J³ moves out of engagement with the contact members J⁴ and J⁵ to break the circuit to stop the motor A. The slow rotation of the contact-wheel F³ does not break the contact between the point F⁵ and the plate F² until some time afterward.

It is understood that in the arrangement shown the cam-wheel K² has eight rises, (see Fig. 2,) and as the cam-wheel K² rotates with the minute-hand sleeve E² it is evident that the slide K is moved down every seven and one-half minutes to cause the controlling-switch G to close and about a minute or so later the contact-wheel pin F⁵ moves in engagement with the contact-plate F² to close the circuit and to cause the motor A to run and wind up the spring D for the clockwork E. The contact-wheel F³ makes one revolution every seven and one-half minutes, and the pin F⁵ remains about one minute in contact with the plate F²; but the motor A runs but a fraction of a minute, as the circuit is broken as soon as the spring D is wound up— that is, as soon as the spring-shaft D' has made one revolution.

From the foregoing it will be seen that by having the two switches arranged as described very little electrical energy is consumed and short-circuiting is completely avoided.

Having thus described my invention, I claim as new and desire to secure by Letters Patent—

1. A self-winding clock, comprising a spring-shaft and a spring-driven clockwork, an electric motor, an electric circuit for the motor, a motor-switch in said circuit, operated from the intermediate driving-gear of the clockwork, and a controlling-switch also in the circuit, operated from the spring-shaft and adapted to open and close the circuit ahead of the motor-switch, said controlling-switch including a vertically-movable and laterally-swinging switch-lever, means on the spring-shaft normally engaged by said lever, and means on the minute-shaft for actuating the same.

2. A self-winding clock, comprising a spring-shaft and a spring-driven clockwork, an electric motor for periodically winding up the clock, an electric circuit, and a controlling-switch in the circuit, operated from the spring-shaft and including a vertically-operating slide, a laterally-movable switch-lever carried thereby, a rotatable device on the spring-shaft periodically engaged by said lever, and means on the minute-shaft for actuating the slide to release it from such engagement.

3. An electrically-self-winding clock comprising a spring-driven clockwork, an electric motor for periodically winding up the driving-spring, an electric circuit for the said motor, a motor-switch in the said circuit, controlled from the intermediate driving-gear of the clockwork, and a controlling-switch in the said circuit, controlled from the spring-shaft and adapted to close automatically ahead of the said motor-switch, the said controlling-switch comprising a switch-lever, a slide on which the switch-lever is fulcrumed, a cam-wheel on the spring-shaft, engaged by the said lever and a cam-wheel on the minute-shaft of the clockwork, for actuating the said slide.

4. An electrically-self-winding clock provided with a controlling-switch for the motor-circuit, comprising a fixed contact, a lever-contact, a slide on which the lever-contact is fulcrumed, a cam-wheel for holding the lever-contact out of contact with the said fixed contact, and a second cam-wheel for imparting movement to the said slide, to disengage the lever-contact from the said first-named cam-wheel for the lever-contact to engage the said fixed contact.

In testimony whereof I have signed my name to this specification in the presence of two subscribing witnesses.

APOLLINARIUS VON KASPIS.

Witnesses:
   THEO. G. HOSTER,
   EVERARD BOLTON MARSHALL.